United States Patent
Kocevar et al.

(10) Patent No.: US 11,187,281 B2
(45) Date of Patent: Nov. 30, 2021

(54) INTEGRATED DISCONNECTING TWIN CLUTCH SYSTEM AND DUAL ACTION PISTON

(71) Applicants: LINAMAR CORPORATION, Guelph (CA); Mike Kocevar, Toledo, OH (US); Shun Ohno, Obu (JP); Todd R Ekonen, Brighton, MI (US); Mitchell Holland, Royal Oak, MI (US); Evan Swinger, Farmington Hills, MI (US)

(72) Inventors: Mike Kocevar, Toledo, OH (US); Shun Ohno, Obu (JP); Todd R Ekonen, Brighton, MI (US); Mitchell Holland, Royal Oak, MI (US); Evan Swinger, Farmington Hills, MI (US)

(73) Assignee: Linamar Corporation, Ontario (CA)

( * ) Notice: Subject to any disclaimer, the term of this patent is extended or adjusted under 35 U.S.C. 154(b) by 116 days.

(21) Appl. No.: 16/335,773

(22) PCT Filed: Sep. 22, 2017

(86) PCT No.: PCT/US2017/052969
§ 371 (c)(1),
(2) Date: Mar. 22, 2019

(87) PCT Pub. No.: WO2018/057899
PCT Pub. Date: Mar. 29, 2018

(65) Prior Publication Data
US 2019/0249725 A1    Aug. 15, 2019

Related U.S. Application Data

(60) Provisional application No. 62/398,164, filed on Sep. 22, 2016.

(51) Int. Cl.
*F16D 21/06*    (2006.01)
*F16D 25/0638*    (2006.01)
(Continued)

(52) U.S. Cl.
CPC .......... *F16D 25/0638* (2013.01); *B60K 17/16* (2013.01); *B60K 17/35* (2013.01);
(Continued)

(58) Field of Classification Search
CPC .... F16D 25/0638; F16D 25/082; F16D 13/69; F16D 21/06; F16H 48/19; F16H 48/22; B60K 17/35
See application file for complete search history.

(56) References Cited

U.S. PATENT DOCUMENTS 3,352,395 A    11/1967    Hilpert
5,964,123 A    10/1999    Okcuoglu
(Continued)

FOREIGN PATENT DOCUMENTS

EP        1279546        1/2003
JP      2006182242        7/2006
(Continued)

*Primary Examiner* — Huan Le
(74) *Attorney, Agent, or Firm* — Miller Canfield

(57) ABSTRACT

A secondary drive unit (SDU) for the secondary axis of an all wheel drive vehicle consists of an SDU housing defining a first section for receiving a main shaft which is connected to a drive source and a second section for enclosing a twin clutch assembly. The twin clutch assembly has a common clutch housing connected to the main shaft, a left clutch for selectively connecting a left output shaft and the clutch housing, a right clutch for selectively connecting a right output shaft and the clutch housing, and a rigid center plate separating the left and right clutches. The twin clutch assembly may be activated by a dual action piston assembly to decrease all wheel drive synchronization and connection response times.

10 Claims, 10 Drawing Sheets

(51) Int. Cl.
  *F16D 13/52* (2006.01)
  *F16D 25/08* (2006.01)
  *F16H 48/19* (2012.01)
  *B60K 17/16* (2006.01)
  *B60K 23/08* (2006.01)
  *B60K 23/04* (2006.01)
  *B60K 17/35* (2006.01)
  *F16D 13/69* (2006.01)
  *F16D 13/74* (2006.01)
  *F16H 48/22* (2006.01)
  *B60K 17/02* (2006.01)

(52) U.S. Cl.
  CPC .............. *B60K 23/04* (2013.01); *B60K 23/08* (2013.01); *F16D 13/52* (2013.01); *F16D 13/69* (2013.01); *F16D 13/74* (2013.01); *F16D 21/06* (2013.01); *F16D 25/082* (2013.01); *F16H 48/19* (2013.01); *F16H 48/22* (2013.01); *B60K 17/02* (2013.01); *B60K 17/165* (2013.01); *B60K 2023/043* (2013.01); *B60K 2023/0833* (2013.01); *B60Y 2400/424* (2013.01)

(56) References Cited

U.S. PATENT DOCUMENTS

| | | |
|---|---|---|
| 9,284,993 B1 | 3/2016 | Kalinsky et al. |
| 2013/0199883 A1 | 8/2013 | Yoshio et al. |

FOREIGN PATENT DOCUMENTS

| | | | |
|---|---|---|---|
| JP | 2006182242 A | * | 7/2006 |
| WO | 2015159955 | | 10/2015 |

* cited by examiner

INTEGRATED DISCONNECTING TWIN CLUTCH SYSTEM AND DUAL ACTION PISTON

CROSS-REFERENCE TO RELATED APPLICATIONS

This application claims priority to U.S. provisional patent application No. 62/398,164, filed Sep. 22, 2016.

FIELD

The present disclosure relates to a twin clutch system for a secondary axle of an all wheel drive vehicle and a hydraulic torque actuator with a dual action piston.

BACKGROUND

Hydraulic torque actuation is commonly used on a secondary axle on a front or rear wheel drive vehicle where all wheel drive is an option. This may be for both permanent active on demand systems (AOD) as well as disconnecting systems where the ring gear and pinion are stopped when the all wheel drive function is not needed. On a side mounted twin clutch axle, where independent torque control of left and right wheels is offered, each left and right mounted clutch has an actuator typically consisting of an independent piston where pressure modulation determines the thrust force and therefore the torque setting.

SUMMARY

According to one embodiment of the present disclosure there is provided a secondary drive unit for an all wheel drive vehicle having left and right secondary drive wheels which are selectively connected to a drive source through the secondary drive unit, the secondary drive unit housing a main shaft operatively coupled to the drive source. The secondary drive unit includes a secondary drive unit (SDU) housing, the housing defining a first section for receiving the main shaft, and the housing defining a second section for enclosing a twin clutch assembly, a left output shaft concentric with the main shaft, the left output shaft for transferring torque to the left secondary drive wheel; and a right output shaft coaxial with the left output shaft, the right output shaft for transferring torque to the right secondary drive wheel. The twin clutch assembly includes a clutch housing connected to the main shaft, a left clutch for selectively connecting the left output shaft and the clutch housing, a right clutch for selectively connecting the right output shaft and the clutch housing, and a rigid center plate extending from an inner wall of the clutch housing, the rigid center plate separating the left and right clutches.

In some embodiments, the second section of the SDU housing is located wholly on one side of the first section of the SDU housing. In some embodiments the right output shaft is piloted and supported by the left output shaft.

In some embodiments, the right clutch may include a set of right separator plates integrated into the clutch housing and interleaved with a set of right friction disks carried by the right output shaft. The left clutch may include a set of left separator plates integrated into the clutch housing and interleaved with a set of left friction disks carried by the left output shaft. The sets of left and right separator plates are separated by the center plate and the sets of left and right friction disks are separated by the center plate.

In some embodiments, one of the right or left clutches further includes a dual action piston assembly. The dual action piston assembly includes a dual action piston, a cavity defined in a first inward facing wall of the SDU housing for receiving the dual action piston, and first and second ports defined in the SDU housing for passing fluid to activate the dual action piston assembly. The dual action piston and the cavity in the first inward facing wall define first and second chambers for receiving fluid through the first and second ports; the first chamber has a volume less than a volume of the second chamber.

In some embodiments, as fluid is received through the first port for activation of the dual action piston assembly, fluid is drawn by the dual action piston assembly into the second port and second chamber.

In some embodiments the dual action piston has a generally H-shaped cross-section. In some embodiments the dual action piston has a generally stepped cross-section.

In some embodiments, the other of the right or left clutches further includes a non-dual action piston assembly, the non-dual action piston assembly includes a non-dual action piston, a cavity defined in a second inward facing wall of the SDU housing for receiving the non-dual action piston, and a third port defined in the SDU housing for passing fluid to activate the non-dual action piston assembly, the non-dual action piston and the cavity in the second inward facing wall defining a third chamber for receiving fluid through the third port.

In some embodiments, the volume of the first chamber of the dual action piston assembly is less than a volume of the third chamber of the non-dual action piston assembly. In some embodiments, the first and second chambers of the dual action piston assembly have substantially the same pressure apply area as the third chamber of the non-dual action piston assembly.

According to one embodiment of the present disclosure there is provided a piston assembly for a clutch of a vehicle drive unit. The piston assembly includes a dual action piston assembly having: a dual action piston, a cavity for receiving the dual action piston, the cavity defined in a first inward facing wall of a housing of the drive unit, and first and second ports defined in the housing of the drive unit for passing fluid to activate the dual action piston assembly, the dual action piston and the cavity in the first inward facing wall defining first and second chambers for receiving fluid through the first and second ports, the first chamber having a volume less than a volume of the second chamber.

In some embodiments, as fluid is received through the first port for activation of the dual action piston assembly, fluid is drawn by the dual action piston assembly into the second port and second chamber.

In some embodiments, the dual action piston has a generally H-shaped cross-section. In some embodiments, the dual action piston has a generally stepped cross-section.

In some embodiments, the piston assembly further includes a non-dual action piston assembly. The non-dual action piston assembly includes a non-dual action piston, a cavity for receiving the non-dual action piston, the cavity defined in a second inward facing wall of the housing of the drive unit, and a third port defined in the housing of the drive unit for passing fluid to activate the non-dual action piston assembly, the non-dual action piston and the cavity in the second inward facing wall defining a third chamber for receiving fluid through the third port.

In some embodiments, the volume of the first chamber of the dual action piston assembly is less than a volume of the third chamber of the non-dual action piston assembly.

In some embodiments, the first and second chambers of the dual action piston assembly have substantially the same pressure apply area as the third chamber of the non-dual action piston assembly.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure is directed to a twin clutch system for a secondary axle on a front or rear wheel drive vehicle which also supports all wheel drive. A dual action piston and methods for actuation of the twin clutch system are also provided. While described and illustrated with reference to the rear axle of a front wheel drive vehicle, the twin clutch system and dual action piston may be used for any secondary axle.

Figure 1:
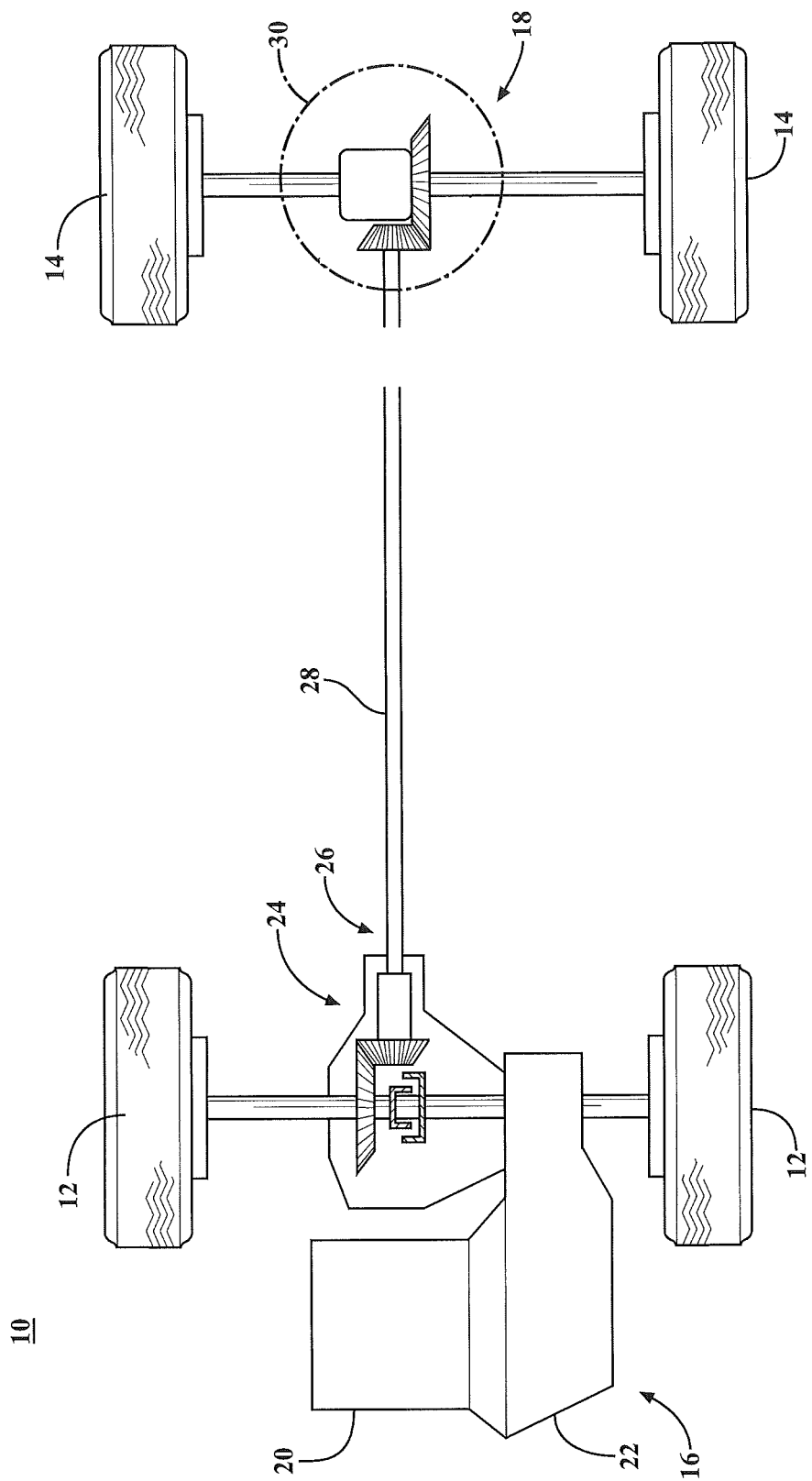
FIG. 1 illustrates a vehicle drive train having a rear axle twin clutch system according to an embodiment of the present disclosure.

FIG. 1 illustrates an exemplary vehicle drive train assembly 10 for transferring torque to first or main set of wheels 12 and a second or secondary set of wheels 14 of a vehicle. The drive train assembly 10 includes a main or front driveline 16 and a secondary or rear driveline 18. The front driveline 16 includes, among other components, an engine 20, a transmission 22 and a power take off unit 24 (PTU). The PTU 24 includes an output 26 to transmit torque through a propeller shaft 28 to secondary drive unit and specifically a rear drive unit 30 (RDU) for driving the rear wheels 14. The RDU 30 includes a twin clutch assembly according to the present disclosure. A controller (not shown) is in communication with the components in the front driveline 16 and rear driveline 18 and also in communication with one or more sensors located throughout the vehicle. The controller is also configured to control the hydraulic system for activating the pistons and twin clutch assemblies as described herein.

Figure 2:
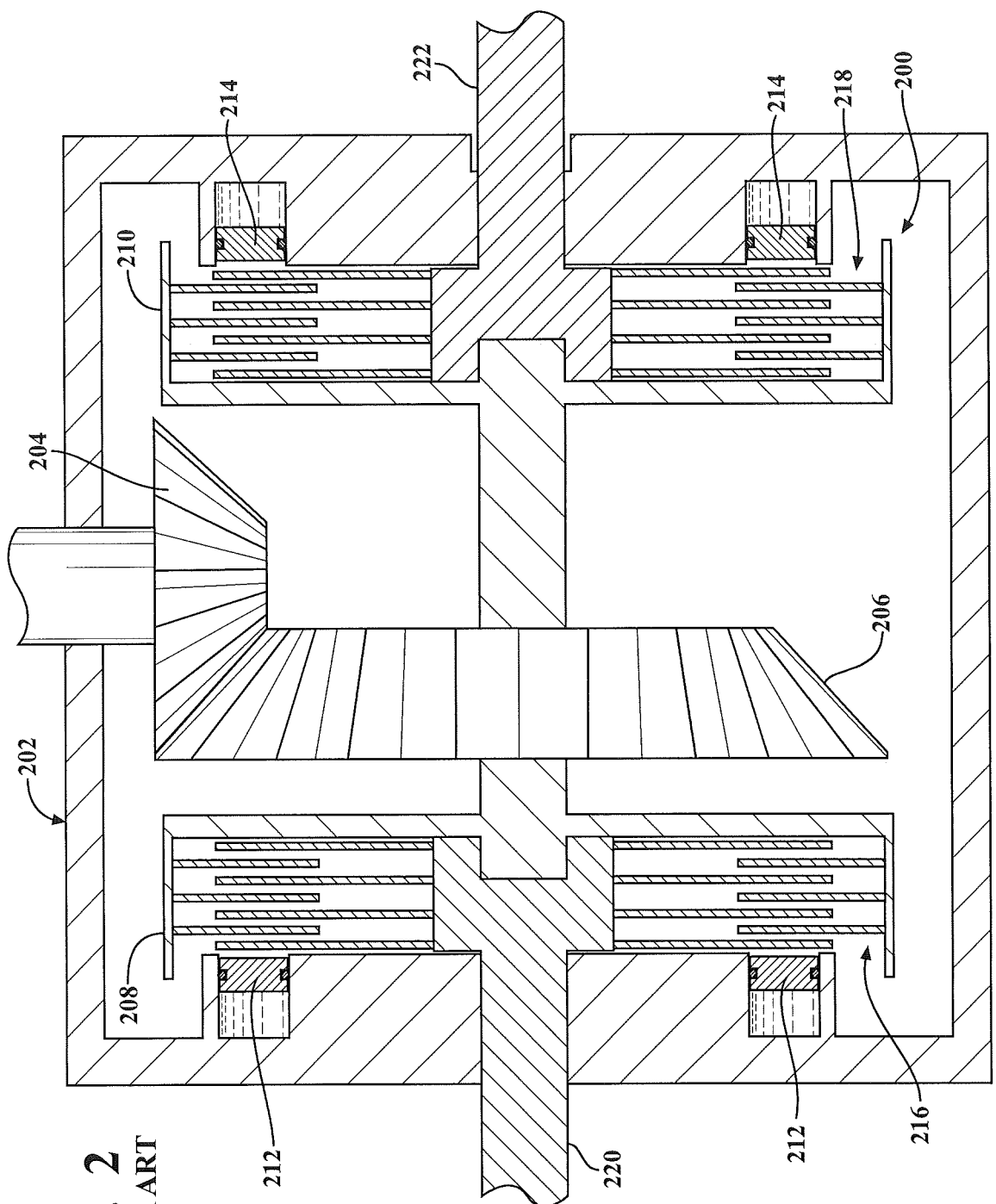
FIG. 2 illustrates a cross-section view of a portion of a rear drive unit and twin clutch system as known in the prior art.

FIG. 2 illustrates a twin clutch assembly 200 as known in the prior art for a rear drive unit 202. Torque flows from the pinion gear 204 to the ring gear 206 and then directly to the left and right clutch housings 208, 210 since they are directly connected. Left and right pistons 212, 214 control the apply pressure on the left and right clutch plates 216, 218 thus independently controlling left and right output torque. The left and right pistons 212, 214 can be made so that the clearance is large enough to separate the clutch plates 216, 218 so that the left and right output shafts 220, 222 and the respective clutch housings 208, 210 become disconnected. In this example, provided that the front of the system is also disconnected, such as in the PTU, the pinion gear 204 and ring gear 206, as well as the propeller shaft 28 will stop rotating. When the need to connect the driveline arises, the pistons 212, and or 214 will modulate enough torque in a controlled manner so that the system is connected smoothly.

Separate left and right clutches pose some challenges, however, in terms of having two clutch housings, separate output shafts with their own bearing supports, and increased width and potentially weight. In addition, sufficient clearance between the clutch plates is needed to reduce parasitic loses during the disconnecting state and provide a low drag when the system is in a disconnected state. The response time, however, from when the clutch is completely open to closing the clearance and starting torque control may be longer than desirable for a dynamic, fast responding AWD system.

Figure 3:
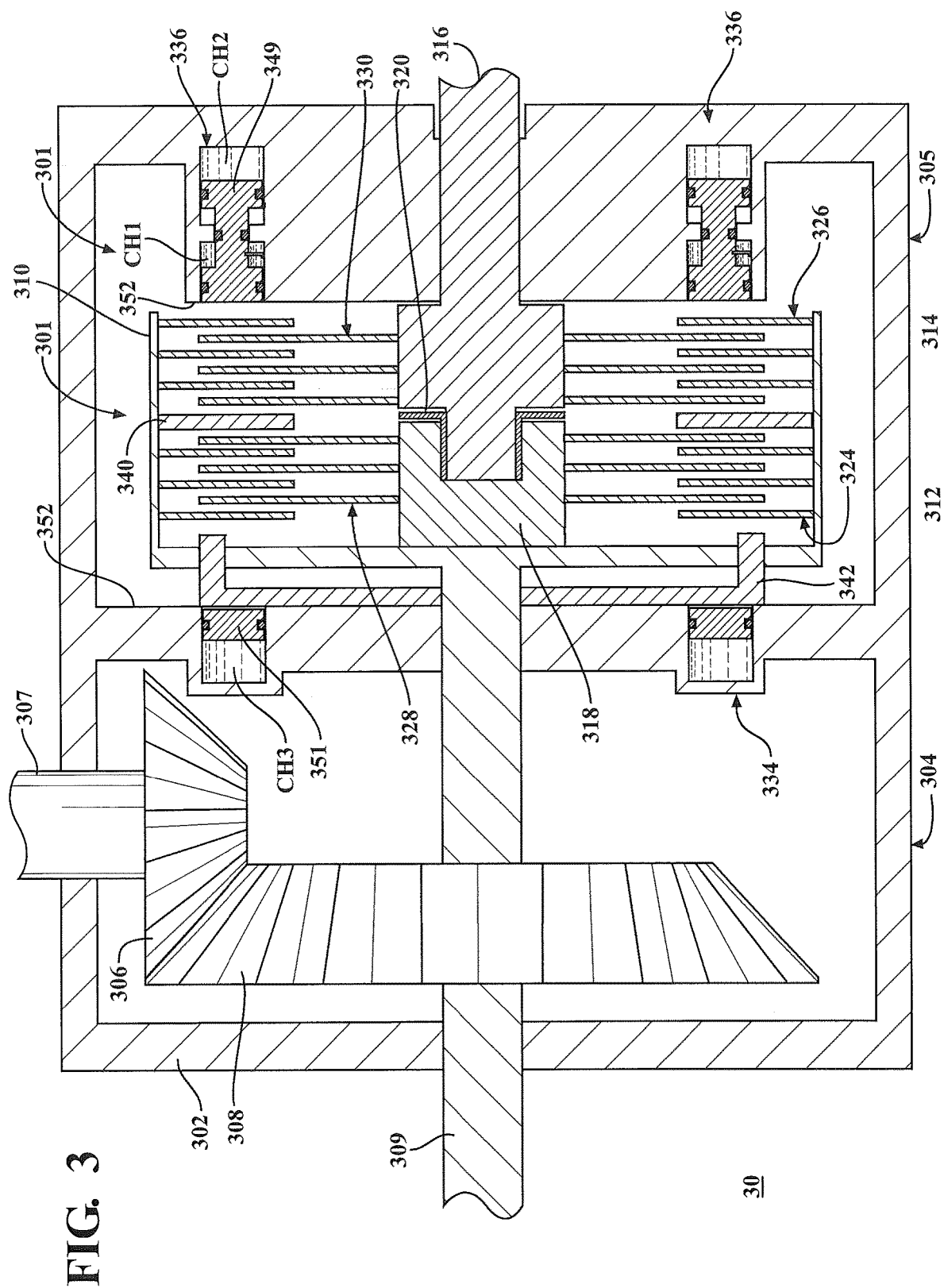
FIG. 3 illustrates a cross-section view of a portion of a rear drive unit and twin clutch system according to a one embodiment of the present disclosure.

An RDU 30 and twin clutch assembly 301 according to one embodiment of the present disclosure are illustrated in FIG. 3. The assembly 301 is contained within the housing 302 of the RDU 30 and is situated on one side of a drive source for the secondary axle. Specifically, the RDU housing 302 defines a first compartment or section 304 which receives the drive source. The RDU housing 302 defines a second compartment or section 305 which contains the twin clutch assembly 301. In one embodiment, the drive source is a pinion gear 306 and pinion shaft 307 which are operatively coupled to the propeller shaft 28 and PTU 24 of the vehicle. The pinion gear 306 is coupled with a ring gear 308 having a main shaft 309 which is received in the section 304. In the embodiment shown in FIG. 3, the second section 305 and assembly 301 are located to the right of the first section 304 of the RDU housing 302. In other embodiments (not shown), a symmetrical or mirror image version of the assembly 301 and second section 305 are located to the left of the drive source and first section 304. In contrast to the twin clutch assembly 200 in FIG. 2, which includes separate right and left clutch assemblies on each side of the drive source, the twin clutch assembly 301 according to the present disclosure is located on one side of the drive source.

The twin clutch assembly 301 includes a common clutch housing 310, a left clutch 312 and a right clutch 314. The clutch housing 310 is connected to the main shaft 309. A right output shaft 316 is piloted and supported by a left output shaft 318. In other embodiments, the left output shaft 318 is piloted and supported by the right output shaft 316. The left output shaft 318 is concentric and coupled within the main shaft 310. Although not extended in FIG. 3, the left output shaft 318 extends from the twin clutch assembly 301, through the main shaft 309, to the left rear wheel. When the clutch assembly 301 is connected to provide AWD, the right output shaft 316 transfers torque to the right rear wheel and the left output shaft 318 transfers torque to the left rear wheel. Depending on the amount of slip required between left and right clutch plates, differential motion is carried out by right and left outputs shafts 316, 318 being piloted together with a bearing or bushing 320. In one embodiment, the right and left outputs shafts 316, 318 are piloted together with an "L" shaped sintered bearing.

Each clutch 312, 314 includes respective sets of left and right separator plates, sets of left and right friction disks, and at least two piston assemblies for activating the clutch. Specifically, each of the left and right clutch assemblies includes respective sets of left and right separator plates 324, 326 which are integrated into the clutch housing 310. In one embodiment, the clutch housing 310 is splined to of the sets of left and right separator plates 324, 326. The left output shaft 318 carries a set of friction disks 328 for the left clutch 312 and the right output shaft 316 carries a set of friction disks 330 for the right clutch 314. The left and right clutches 312, 314 are actuated by respective pairs of left and right hydraulic piston assemblies, 334, 336. Thus, independent torque biasing is enabled.

The twin clutch assembly 301 includes a centre plate 340 which separates the set of left separator plates 324 and the set of right separator plates 326 in order to support independent left and right torque control. The centre plate 340 is stiff enough to carry the thrust load from the pistons 334, 336. Specifically, the centre plate 340 is stiff enough to react against the actuation force from either side of the clutch assembly 301 to avoid the plate 340 deflecting and compressing the clutch plates in the other side of the assembly 301. In one embodiment, the centre plate 340 is rigidly fixed to the clutch housing 310. In one embodiment, the left piston assembly 334 actuate the left clutch 312 via an external apply plate 342. The external apply plate 342 may be mated to the side of the clutch housing 310 through windows or apertures (not shown) to squeeze the clutch plates inside. The right piston assembly 336 actuates the right clutch 314 through one of the clutch plates, as described below.

In two wheel drive (2WD) mode, the friction disks 328, 330 and separator plates 324, 326 are spaced apart to cause a disconnect between the ring gear 308 and left and right output shafts 316, 318. In order to change the state back to a connected AWD drive mode, the ring gear 308 is synchronized to approximately the same relative speed as the rear wheels 14. Torque is generated to overcome the inertial torque to spin the ring gear 308, the pinion shaft 307 and the propeller shaft 28 to the same relative speed of the vehicle. This can be accomplished by engaging either one of the left and right clutches 312, 314 at the same time or in serial fashion. The speed of synchronization will depend on how quickly the clearance gap is taken up by one or both of the left and right clutches 312, 314 and the torque response of the actuator to produce torque in the clutches 312, 314. Once the driveline components are synchronized and the PTU 24 is connected, torque modulation can take place.

The self contained clutch assembly 301 has a smaller overall size and enables an actuator system to be placed near the assembly 301, resulting in shorter overall fluid porting to both left and right hydraulic piston assemblies. Thus, a faster responding AWD system may be achieved. In one embodiment, both clutches 312, 314 could be utilized to start the synchronization process, depending on the torque required. In one embodiment (not shown), the left and right hydraulic piston assemblies 334, 336 are provided with symmetrical geometries and cavity sizes and thus each piston has a similar response or performance. In other embodiments, since the torque level to synchronize the driveline is relatively small as compared to the capacity of the left and right clutches 312, 314, just one of the clutches is used to synchronize the driveline.

As illustrated in FIG. 3, to further improve the synchronization and AWD connection response time, the right hydraulic piston assembly 336 is configured as a dual action piston according to one embodiment of the present disclosure. Since only one clutch may be needed to synchronize the driveline, the dual action piston assembly 336 is configured to engage the right clutch 314 or "synchronizing clutch" more quickly than the "non-synchronizing" left clutch 312. The dual action piston assembly 336 includes a dual action piston 349 received or mounted a first cavity defined in a first inward facing wall 350 of the RDU housing 302. The dual action piston 349 and the first cavity define two chambers, CH1 and CH2, for receiving fluid for actuating the piston assembly 336. In the embodiment shown in FIG. 3, the two chambers CH1 and CH2 are spaced apart linearly within the cavity for the dual action piston assembly 336 and are defined by the piston 349 having a generally "H" shaped cross-section. The non-dual action left piston assembly 334 includes a piston 351 received or mounted in a second cavity defined in a second inward facing wall 352 of the RDU housing 302. The piston 352 and the second cavity define a third chamber CH3 for receiving fluid for actuating the piston assembly 334. A bias means (not shown in FIG. 3) is provided to return the pistons 349, 351 to their retracted positions. Bearings (not shown in FIG. 3) also may be placed between the piston assemblies 334, 336 and the apply plate 342 and right separator plates 326.

In one embodiment of the dual action piston assembly 336, the overall volume of chamber CH1 is less than the volume of CH2 and it is also less than the volume of chamber CH3 for the left piston assembly 334. As a result, as described below, the right piston 349 moves faster when the filling rate is the same for both piston assemblies. Since the reaction torque to synchronize the driveline is relatively small, only one clutch and the partial piston surface area of the dual action piston assembly 336 can be used with a faster response time as a result. The piston assembly 336 performs dual functions by quickly overcoming the clearance and synchronizing the right clutch 314 while at the same time chamber CH2 is filled. Chambers CH2 and CH3 for piston assemblies 336, 334 may be equally sized so that the left and right pistons 351, 349 will push with the same force during primary torque control.

Figure 4:
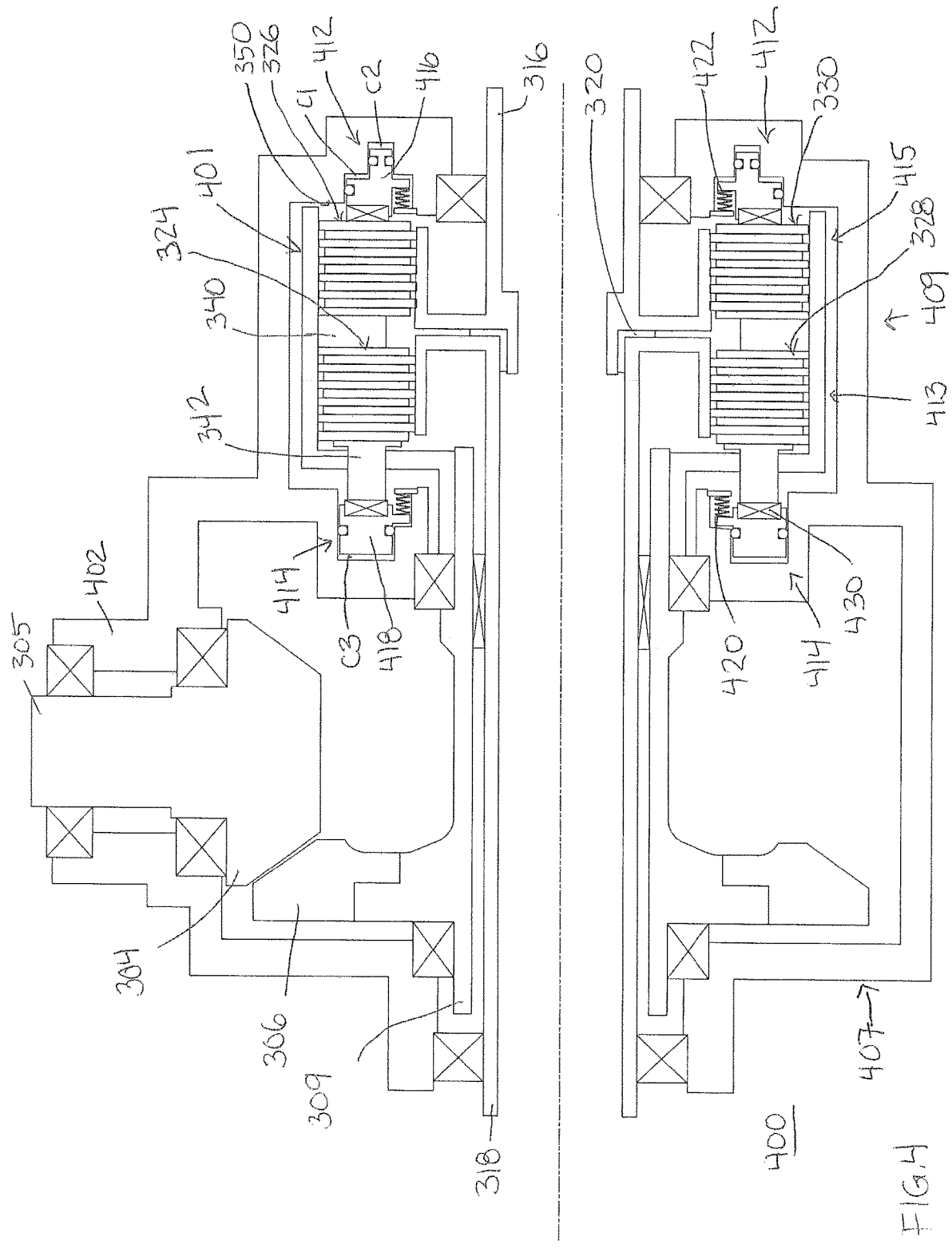
FIG. 4 is a cross-section view of a portion of a rear drive unit and twin clutch system according to another embodiment of the present disclosure.

An RDU 400 and twin clutch assembly 401 according to another embodiment of the present disclosure is illustrated in FIG. 4. The assembly 401 is similar to the assembly 301 shown in FIG. 3 but includes a different configuration of the RDU housing 402 and a different embodiment of a dual action piston assembly 412 for the right clutch 415. A different embodiment of the non-dual action piston assembly 414 is also provided for the left clutch 413.

The dual action piston assembly 412 includes a dual action piston 416 received or mounted a first cavity defined in the first inward facing wall 350 of the RDU housing 401. The dual action piston 416 and the first cavity define two chambers, C1 and C2, for receiving fluid for actuating the dual action piston assembly 412. In the embodiment shown in FIG. 4, the two chambers C1 and C2 are staggered or spaced apart axially and radially within the cavity and are defined by the piston 416 having a stepped cross-section. The non-dual action left piston assembly 414 includes a piston 418 received or mounted in a second cavity defined in a second inward facing wall 352 of the RDU housing 402. The piston 416 and the second cavity define a chamber C3 for receiving fluid for actuating the piston assembly 414. The twin clutch assembly 401 includes bias means to return the pistons 416, 418 to their retracted or disconnected positions. Example bias means are shown in FIG. 4 with right and left springs 422, 420 engaging the pistons 416, 418 and portions of the RDU housing 402. Bearings also may be placed between the piston assemblies 412, 412 and the apply plate 342 and right separator plates 326.

In this embodiment, the volume of chamber C1 is less than the volume of C2 and only one clutch and the partial piston surface area of the dual action piston assembly 412 can be used for synchronization with a faster response time as a result. Collectively, chambers C1 and C2 have the same pressure apply area as the non-dual action left piston assembly 414 with chamber C3 so that the left and right pistons 418, 416 will push with the same force during primary torque control.

The sizes and geometries of the chambers for each piston assembly 334, 336, 412, 414 may vary and the ratio of the chamber sizes, orifice sizes, porting diameters, valve clearances and pump flow rates are configured to maximize piston stroke response. While the dual action piston assembly is shown for the right clutch in FIGS. 3 and 4, in other embodiments, the left piston assembly may be configured as a synchronizing, dual action piston and the right piston assembly may be a non-synchronizing, non-dual action piston. In other embodiments, both the left and right piston assemblies may be configured as a synchronizing, dual action piston. It will also be appreciated that the dual action piston assemblies according to the present disclosure also may be used in other disconnecting clutch systems, such as the assembly shown in FIG. 2.

Figure 5:
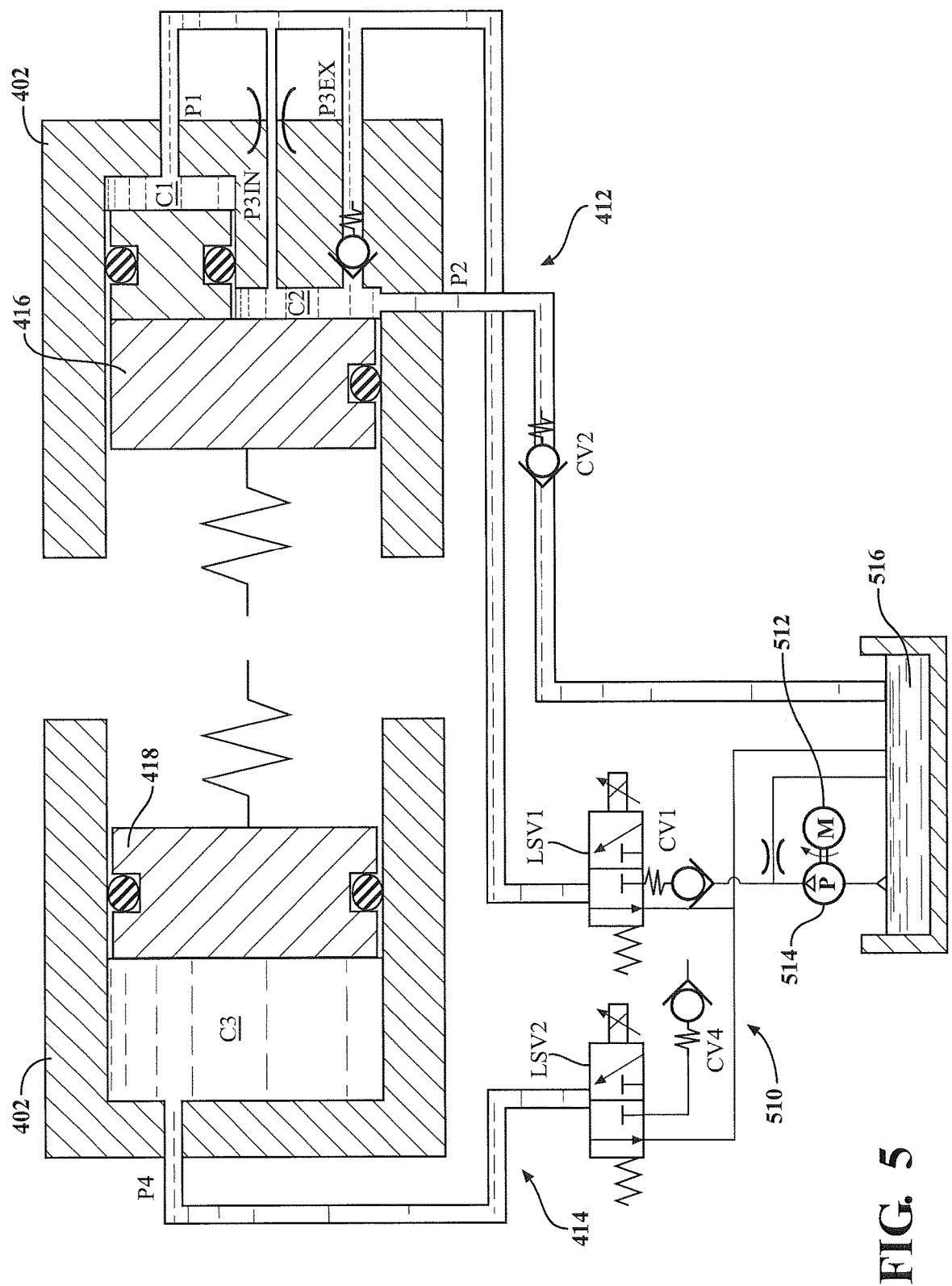
FIG. 5 is a diagram illustrating the operation of a hydraulic control system and the dual action piston shown in FIG. 4.
Figure 6:
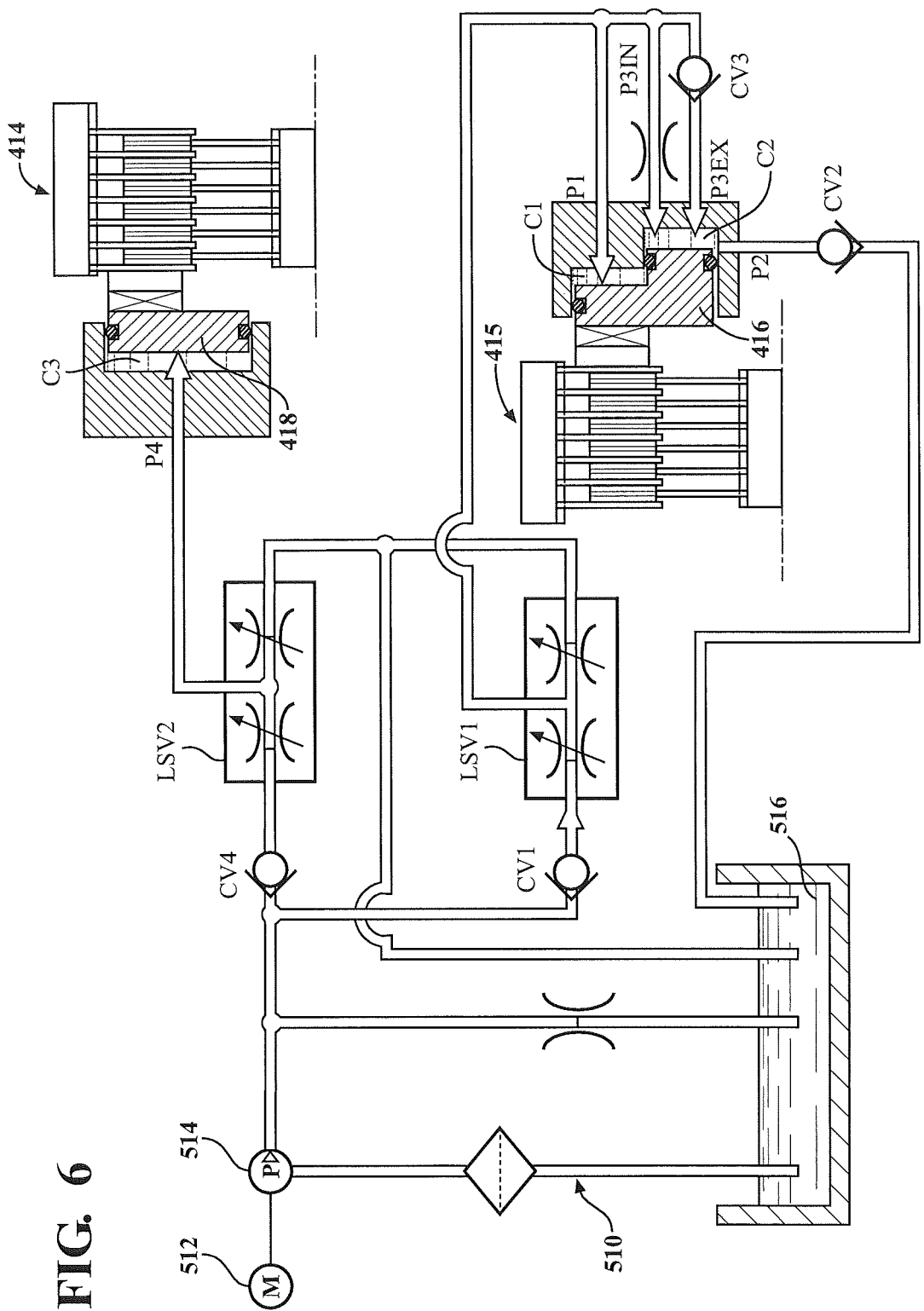
FIG. 6 is a schematic diagram illustrating the hydraulic control system.

The operation of the twin clutch assembly 401 will be described first with reference to the illustration of the piston assemblies 412, 414, hydraulic control system 510 and hydraulic schematic in FIGS. 5 and 6. Starting from a disconnected state, a controller (not shown) activates an electric motor 512 in the hydraulic control system 510. The controller may be part of the vehicle controller or a stand-alone system. The motor 512 spins an electric pump 514 to generate hydraulic pressure. In one embodiment, the motor 512 operates at a fixed speed resulting in the pump 514 providing a fixed flow rate. The pump 514 forces hydraulic fluid from a reservoir 516 through a one-way check valve CV1 into a linear solenoid valve LSV1 which is also controlled electronically by the controller. Hydraulic fluid flows from the valve LSV1 through a dedicated port P1 into the chamber C1 of the right or dual action piston assembly 412. Chamber C1 is filled with fluid under pressure and as a result, the piston 416 moves more rapidly since a smaller cavity, relative to chamber C3 for piston assembly 414, is being filled. The force applied by the piston 416 to the outer separator plate of the right clutch 415 is sufficient to synchronize the driveline components. In other words, since the reaction torque to synchronize the driveline is relatively small, only the right clutch 415 and a partial piston surface area of the dual action piston assembly 412 are used at this stage. This results in a faster response time for synchronizing and ultimately engaging the driveline components for AWD operation.

While the dual action piston 416 moves towards the right separator plates 326 (to the left in FIG. 4), a negative pressure or vacuum is created in chamber C2 which causes chamber C2 to be filled as it draws fluid from the reservoir 516 through a one way check valve CV2 and input port P2. Although a second input port P3 IN is provided for chamber C2, this port is configured with a smaller orifice. Thus, as the chamber C1 is being filled, limited fluid flows into chamber C2 through port P3 IN. The piston cavity ratio, C1 vs. C2, orifice size, porting diameters, valve clearances and pump flow rates are configured to ensure that the piston stroke response is maximized. Chambers C1 and C2 and the piston 416 are configured such that once the piston 416 has moved through its complete stroke, to a contact point or kiss point (clutch clearance take up) of the right clutch 415, both chambers C1 and C2 are filled and are at equal pressure. At the kiss point, equal pressure is supplied to chambers C1, C2 through ports P1 and P3 IN, respectively. Although the orifice of P3 IN is restricted, it is sufficiently sized to enable pressure control in chamber C2 for torque modulation. Pressure relief from chamber C2 is provided by a one way check valve CV3 through port P3 EX to a drain port of the LSV1. Pressure relief from chamber C1 is provided through a drain port of the LSV1.

Figure 7:
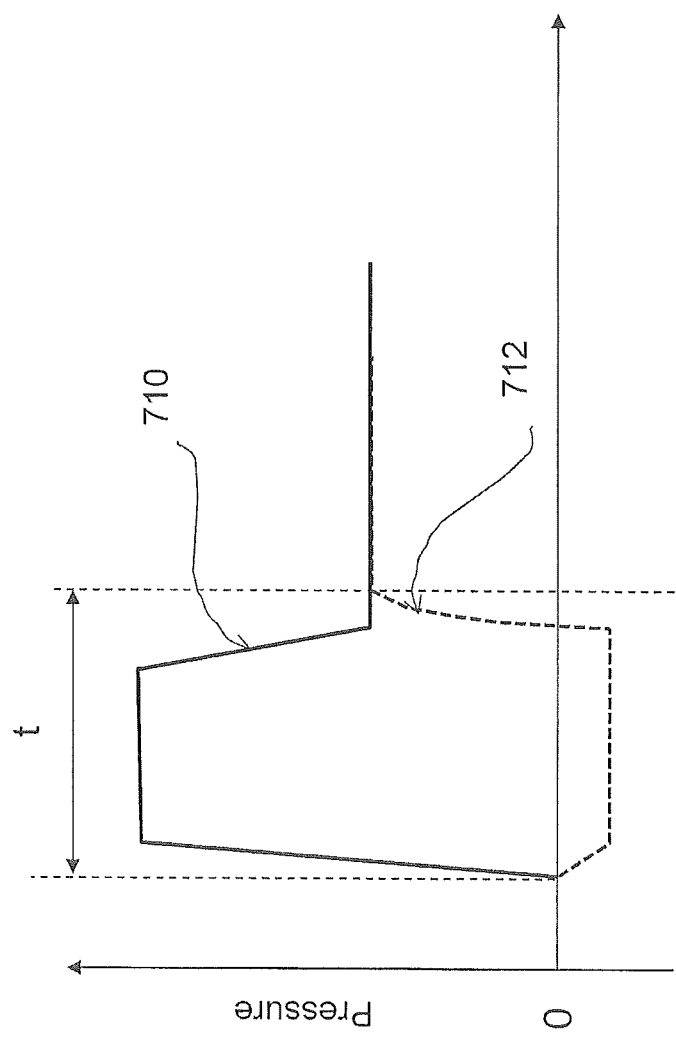
FIG. 7 is a graph illustrating pressures in dual action piston according to one embodiment of the present disclosure.

FIG. 7 is a graph illustrating pressures in the chambers C1 and C2 during this process. The upper line 710 of the graph shows the primary piston pressure for chamber C1. The secondary piston pressure for chamber C2 is indicated by the dashed lower line 712 of the graph and this shows the negative pressure initially created in chamber C2. The time t denotes the time for the dual action piston 416 to engage the right clutch 415 and take up or overcome the clearance between the friction disks 330 and separator plates 326. The pressure in chamber C1 is initially larger in order to quickly overcome or take up the clearance between the clutch plates in the right clutch 415. Pressure is reduced as the right clutch 415 nears the kiss point. After that stage, once the driveline components are synchronized, torque modulation is achieved by controlling the pressures in chambers C1 and C2 through ports P1 and P3 IN.

Figure 8:
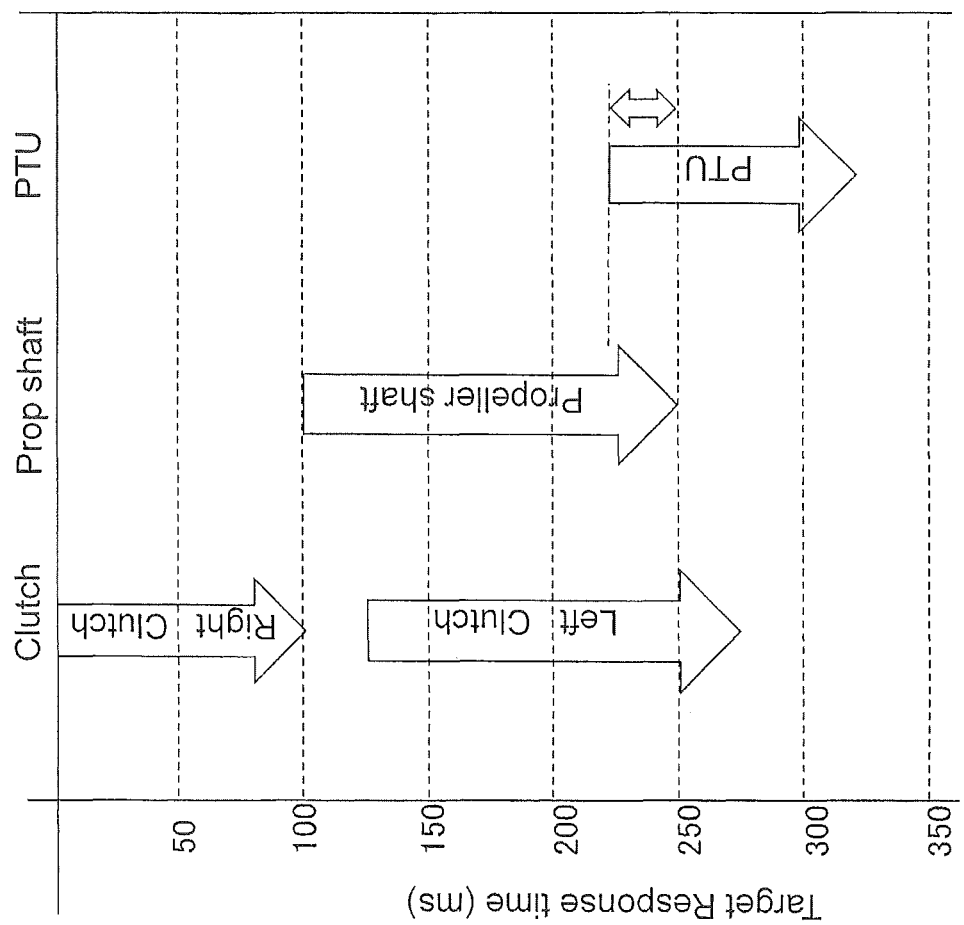
FIG. 8 is a graph illustrating synchronization response times for vehicle driveline components according to one embodiment of the present disclosure.

In one embodiment, once the right clutch 415 has provided enough torque to synchronize the driveline components, the controller activates the left piston assembly 414 through the control of linear solenoid valve LSV2. Specifically, the pump 514 forces hydraulic fluid from the reservoir 516 through a one way check valve CV4 into LSV2. Hydraulic fluid flows from the valve LSV2 through a dedicated port P4 into the chamber C3 of the left or non-dual action piston assembly 414. Pressure relief from chamber C3 is provided through a drain port of the valve LSV1. Once both left and right piston assemblies 414, 412 are at their stand by or kiss point positions, and once the driveline components are synchronized and the PTU is connected, torque modulation can take place. In one embodiment, some amount of engagement overlap between the left clutch 413 clearances being overcome, the synchronization of the propeller shaft 28, and the connection in the PTU 24 can be realized in order to improve the total system response. FIG. 8 illustrates an example time line and such overlap for one embodiment. As shown, the synchronization time for the rotation of the propeller shaft 28 may start after the right clutch 415 reaches the kiss point and may overlap with the activation of the left clutch 413. The PTU engagement also may overlap with the synchronization for the rotation of the propeller shaft 28 and the activation of the left clutch 413 to its clearance point.

For the twin clutch assembly 401 to return to a disconnected state, the controller operates the linear solenoid valves LSV1 and LSV2 to drain or bleed out fluid from chambers C1, C2 and C3 through ports P1, P3 EX and P4, respectively. The left and right pistons 418, 416 retract back to an open or disconnected position. In one embodiment, the left and right pistons 418, 416 are urged back to the open or disconnected position by a bias means such as the springs 420, 422, as illustrated in FIG. 4.

Figure 9:
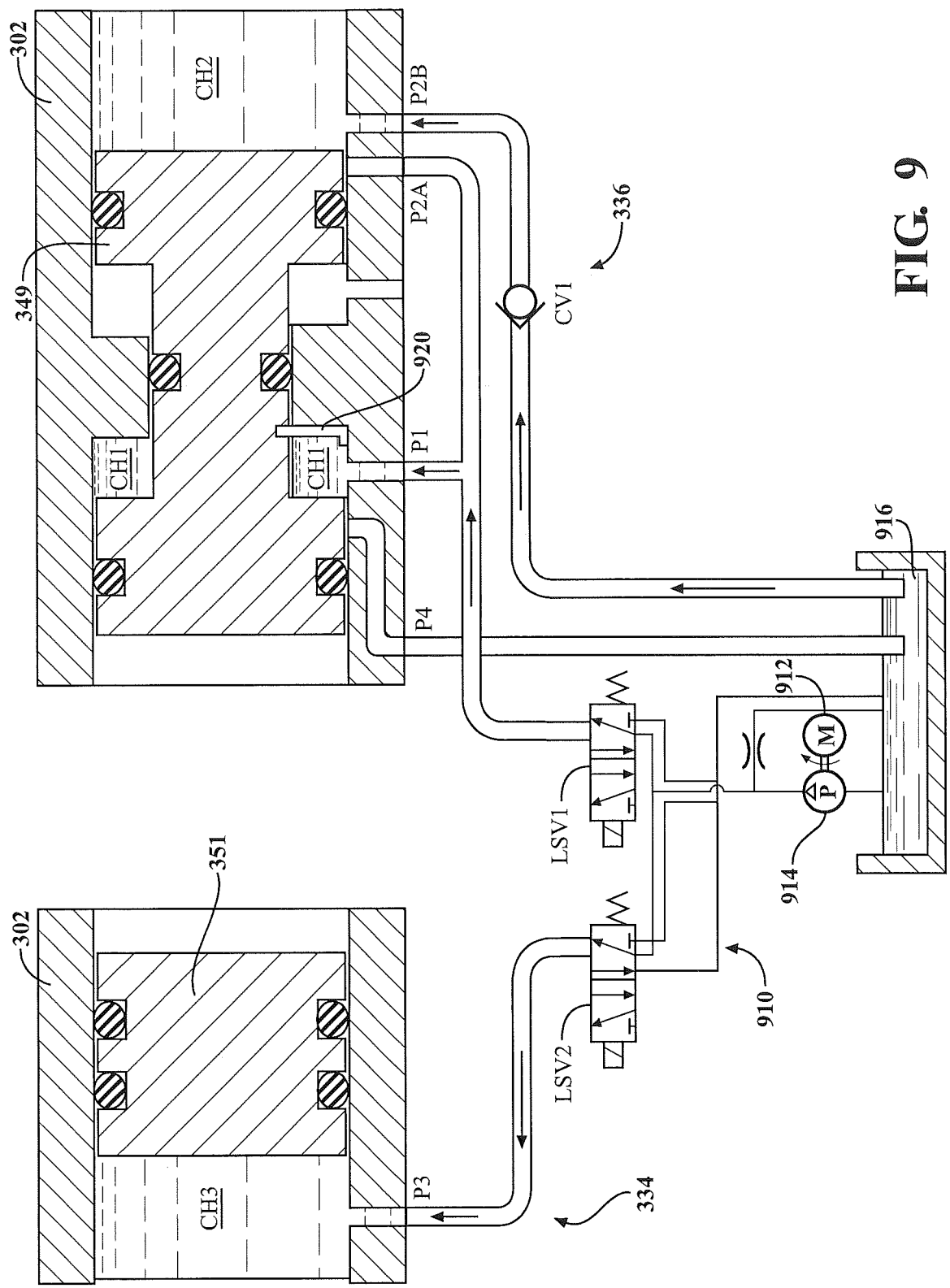
FIGS. 9 and 10 are diagrams illustrating two stages of the operation of a hydraulic control system for the dual action piston assemblies shown in FIG. 3.

Alternative synchronization and engagement sequences may be implemented depending on the arrangement of the dual action piston assembly and the desired performance of the twin clutch assembly. The operation of the embodiment of the clutch assembly 301 of FIG. 3 is described with reference to the illustration of the piston assemblies 334, 336 and hydraulic control system 910 in FIGS. 9 and 10. Again, the apply principle is accomplished in two stages. The first is to move the right clutch 314 to the kiss point and synchronization and the second is torque modulation by using the respective filled chambers. FIG. 9 represents a starting point from a disconnected state and FIG. 10 represents the state of the piston assemblies 334, 336 and hydraulic control system 910 at the kiss point.

Specifically in FIG. 9, starting from a disconnected state, the controller activates an electric motor 912 and controls linear solenoid valves LSV1, LSV2 in the hydraulic control system 910. The motor 912 spins an electric pump 914 to generate hydraulic pressure. The pump 914 forces hydraulic fluid from a reservoir 916 through valves LSV1 and LSV2 and ports P1 and P3 to fill chambers CH1 and CH3. Port P2A for chamber CH2 is blocked during this process by the piston 349. As the dual action piston 349 moves towards the right separator plates 326 (to the left in FIG. 9), a negative pressure or vacuum is created in chamber CH2 which causes chamber CH2 to be filled as it draws fluid from the reservoir 916 through a one way check valve CV1 and port P2B. Although all three chambers CH1, CH2, CH3 are being filled in this embodiment, the right piston 351 moves more quickly than the left piston 349 since the size of CH1 is less than the size of CH3. Thus, the right piston 349 moves the right clutch 314 to the kiss point to start synchronization.

Figure 10:
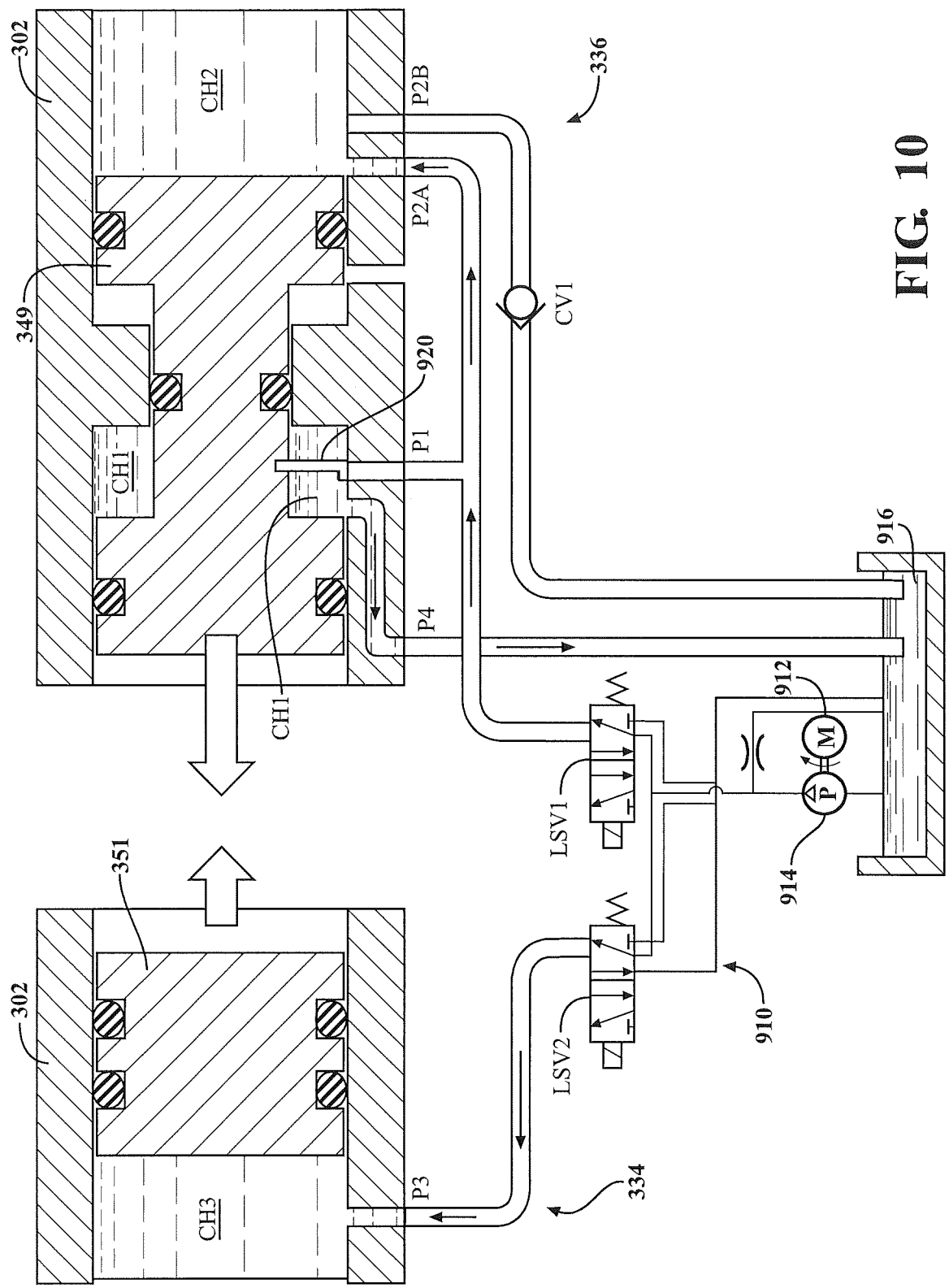

As shown in FIG. 10, as the right piston 349 completes its stroke, port P2A is opened and chamber CH2 is filled completely. Also as port P2A opens, an axial valve 920 in the chamber CH1 closes port P1 and port P4 is opened. As a result, at the kiss point, fluid from chamber CH1 discharges back into the reservoir 916. The one way check valve CV1 prevents fluid from backing out of chamber CH2 through port P5. Thus, during torque modulation, fluid in chamber CH1 is discharged to the reservoir 916 through P4 so that the left and right piston assemblies 334, 336 will push with the same force during primary torque control.

Either the left or the right piston assembly can be a dual action piston and initially made to move faster than the other with the same supply pressure to both right and left sides. Therefore the synchronization (from an open piston to the kiss point or standby mode) can happen more quickly without any additional moving parts. One piston assembly is made to have a dual role by adding two cavities with which the piston is controlled. The dual action piston assembly 336 also fills chamber CH1 under pressure and chamber CH2 under vacuum due to the moving piston so that both chambers are filling under the leftward movement of the piston 349. Since chambers CH2 and CH3 are of equal size, and are controlled and configured to fill at relatively the same rate, this ensures that primary piston pressure for primary torque control is available at the same time.

For the twin clutch assembly 301 to return to a disconnected state, the controller operates the linear solenoid valves LSV1 and LSV2 to drain or bleed out fluid from chambers CH2 and CH3 through ports P2A and P3, respectively. The left and right pistons 351, 349 retract back to an open or disconnected position. In one embodiment, the left and right pistons 351, 349 are urged back to the open or disconnected position by a bias means such as springs.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described. The subject matter described herein and in the recited claims intends to cover and embrace all suitable changes in technology.

The invention claimed is:

1. A secondary drive unit for an all-wheel drive vehicle having left and right secondary drive wheels which are selectively connected to a drive source through the secondary drive unit, the secondary drive unit housing a main shaft operatively coupled to the drive source, the secondary drive unit comprising:
   a secondary drive unit (SDU) housing, the housing defining a first section for receiving the main shaft, and the housing defining a second section for enclosing a twin clutch assembly,
   a left output shaft concentric with the main shaft, the left output shaft for transferring torque to the left secondary drive wheel;
   a right output shaft coaxial with the left output shaft, the right output shaft for transferring torque to the right secondary drive wheel;
   the twin clutch assembly having:
      a clutch housing connected to the main shaft,
      a left clutch for selectively connecting the left output shaft and the clutch housing,
      a right clutch for selectively connecting the right output shaft and the clutch housing, and
      a rigid center plate extending from an inner wall of the clutch housing, the rigid center plate separating the left and right clutches; and
   wherein one of the right or left clutches further comprises a dual action piston assembly, the dual action piston assembly comprising:
      a dual action piston,
      a cavity defined in a first inward facing wall of the SDU housing for receiving the dual action piston, and
      first and second ports defined in the SDU housing for passing fluid to activate the dual action piston assembly, the dual action piston and the cavity in the first inward facing wall defining first and second chambers for receiving fluid through the first and second ports, the first chamber having a volume less than a volume of the second chamber.

2. The secondary drive unit of claim 1 wherein the second section of the SDU housing is located wholly on one side of the first section of the SDU housing.

3. The secondary drive unit of claim 1 or claim 2 wherein the right output shaft is piloted and supported by the left output shaft.

4. The secondary drive unit of claim 1 wherein the right clutch comprises a set of right separator plates integrated into the clutch housing and interleaved with a set of right friction disks carried by the right output shaft and wherein the left clutch comprises a set of left separator plates integrated into the clutch housing and interleaved with a set of left friction disks carried by the left output shaft, the sets of left and right separator plates being separated by the center plate and the sets of left and right friction disks being separated by the center plate.

5. The secondary drive unit of claim 1 wherein as fluid is received through the first port for activation of the dual action piston assembly, fluid is drawn by the dual action piston assembly into the second port and second chamber.

6. The secondary drive unit of claim 1 wherein the dual action piston has a generally H-shaped cross-section.

7. The secondary drive unit of claim 1 wherein the dual action piston has a generally stepped cross-section.

8. The secondary drive unit of claim 1 wherein the other of the right or left clutches further comprises a non-dual action piston assembly, the non-dual action piston assembly comprising:
   a non-dual action piston,
   a cavity defined in a second inward facing wall of the SDU housing for receiving the non-dual action piston, and
   a third port defined in the SDU housing for passing fluid to activate the non-dual action piston assembly,
   the non-dual action piston and the cavity in the second inward facing wall defining a third chamber for receiving fluid through the third port.

9. The secondary drive unit of claim 8 wherein the volume of the first chamber of the dual action piston assembly is less than a volume of the third chamber of the non-dual action piston assembly.

10. The secondary drive unit of claim 8 wherein the first and second chambers of the dual action piston assembly have substantially the same pressure apply area as the third chamber of the non-dual action piston assembly.

* * * * *